Patented Dec. 8, 1925.

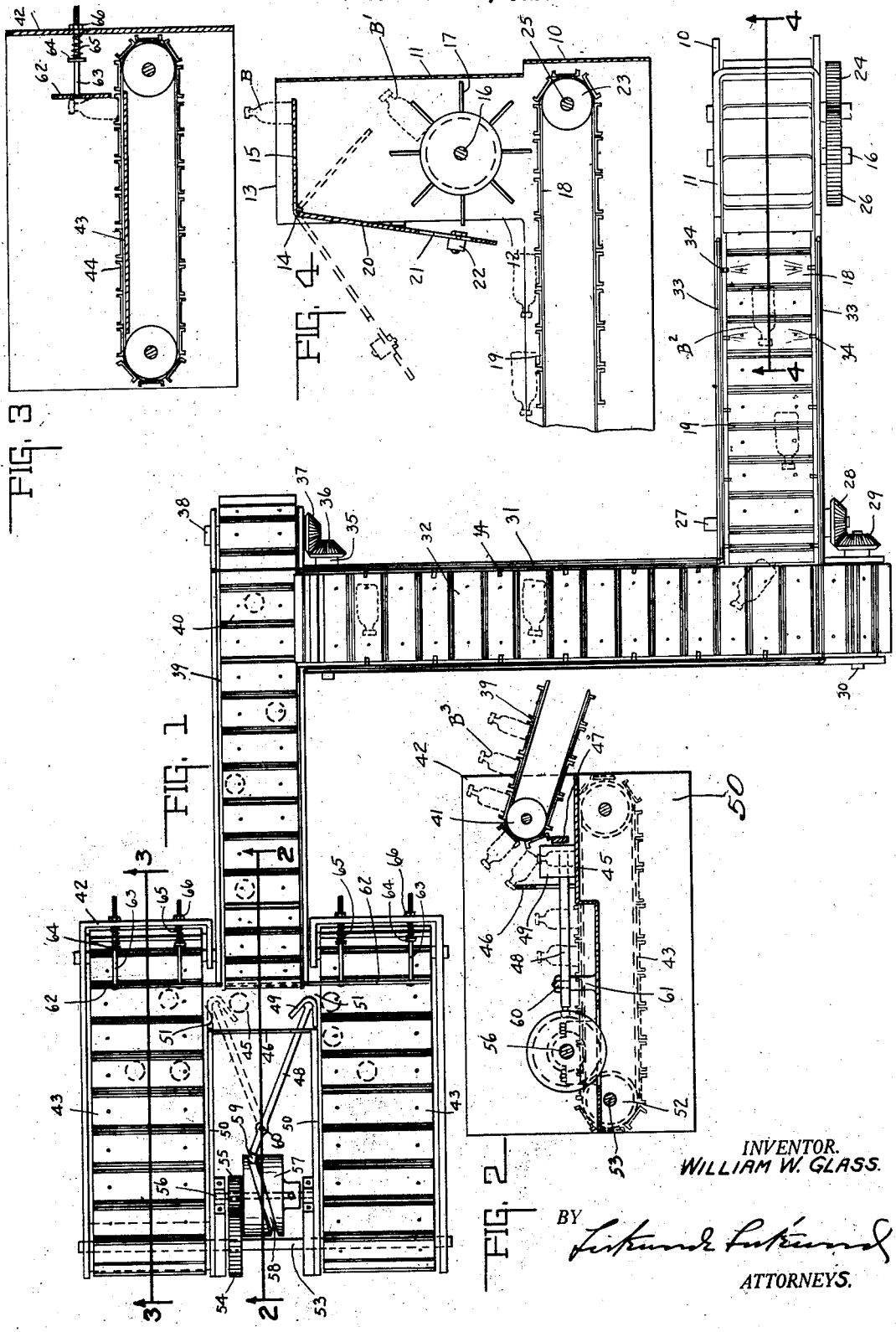

1,564,477

UNITED STATES PATENT OFFICE.

WILLIAM W. GLASS, OF GAS CITY, INDIANA, ASSIGNOR, BY DIRECT AND MESNE ASSIGNMENTS, TO JOHN F. SPARKS AND WILLARD C. JOHNSON, BOTH OF SUMMITVILLE, INDIANA.

AUTOMATIC BOTTLE CONVEYER AND FEEDER FOR LEERS.

Application filed January 11, 1924. Serial No. 685,592.

*To all whom it may concern:*

Be it known that I, WILLIAM W. GLASS, a citizen of the United States, and a resident of Gas City, county of Grant, and State of Indiana, have invented a certain new and useful Automatic Bottle Conveyer and Feeder for Leers; and I do hereby declare that the following is a full, clear, and exact description thereof, reference being had to the accompanying drawings, in which like numerals refer to like parts.

This invention relates to an automatic bottle conveyer and feeder construction for leers.

The chief object of this invention is to automatically and mechanically transfer bottles as they are discharged automatically from the mold of a bottle molding machine to a leer.

The chief feature of the invention consists in the provision of means whereby this automatic transfer is accomplished without the checking or breaking of the bottles and without any manual attention whatsoever.

Minor features of construction consist in the provision of a bottle conveyer with which is associated suitable heat applying mechanism for heating the bottles handled by the conveyer, so that the same will not check or chip or cool unduly and thereby set up unbalanced strains in said bottles.

Another feature of the invention consists in the provision of a chute and associating therewith suitable mechanisms for automatically receiving the bottles automatically discharged from the bottle molding machine and transferring the bottles to said conveyer in a predetermined position.

Another feature of the invention consists in the means for presenting the bottles to the leer which in the present instance is shown divided and provided with means whereby the bottles are alternately presented to each division of the leer and in a predetermined position.

Another feature of the invention consists in the provision of a common means for actuating the leer divisions, whereby they will operate in timed relation and means operable by said common means for actuating the transferring means supplying bottles to said leer divisions whereby said bottles are presented to the leer divisions in timed relation with the passage or movement of said leer divisions in the leer housing.

The full nature of the invention will be understood from the accompanying drawings and the following description and claims:

In the drawings, Fig. 1 is a top plan view of the invention with a portion omitted. Fig. 2 is a longitudinal sectional view taken on the line 2—2 of Fig. 1 and in the direction of the arrows. Fig. 3 is another sectional view taken on the line 3—3 of Fig. 1 and in the direction of the arrows. Fig. 4 is also a sectional view and is taken on the line 4—4 in the direction of the arrows and not only includes what is shown in Fig. 1 but also includes the remainder of the mechanism not shown in said figure.

In the drawings 10 indicates a housing having a chute 11 provided with an open face 12 and an open top 13. Pivotally supported at 14 in said chute near the top thereof is a platform 15 which is movable downwardly in the chute, and as shown in Fig. 4, is adapted to receive a bottle B when in horizontal position. The weight of said bottle tilts the platform upon its pivot 14 so that the bottle is discharged as at B' into a rotating hopper construction. The rotating hopper or compartment construction consists of a horizontal and pivotally supported wheel 16 having the blades 17 thereon. The bottle is passed forwardly and downwardly through the open side 12 of the chute and is discharged neck foremost on to a conveyer 18 including upon its exposed surface a plurality of transversely positioned trough forming members 19.

The platform 15 is provided with a lever 20, and said lever is provided with a longitudinal slot 21; and positioned in said slot and adjustably secured upon said lever is a counterweight 22. The counterweight returns the platform 15 to the horizontal position as shown by the full lines in Fig. 4 after the bottle has been discharged therefrom and received by the hopper. The bottle received by the hopper is adapted to move the lever 20 and permit the free passage of said bottle through the chute and open face thereof, and in this manner said lever 21 is adapted to yieldingly retain the bottle in the hopper until a predetermined discharge position has been attained by the bottle B', Within the housing 10, there is provided the conveyer 18 provided with the driving wheel 23 having a gear 24 associated with a shaft 25. A gear 26 is associated with the shaft 16, and thus the rotary hopper and the conveyer operate in timed relation. Herein the conveyer 18 at its opposite end is shown provided with a shaft 27 which carries a bevel gear 28 adapted to mesh with another bevel gear 29 upon a shaft 30 of a second conveyer 31 having similarly positioned trough-forming members 32 upon its surface, and said conveyer 31 is positioned angularly of the conveyer 18. At each side of the conveyer 18, there is provided a suitable heat supplying means, such as the pipe 33, having the jets 34 by which a gas flame is discharged into the path of the bottles B² carried by the conveyer 18.

The troughs 32 of the conveyer 31 are adapted to convey the bottles in a different position from that conveyed by the conveyer 18. The opposite end of the conveyer 31 is provided with a shaft 35 carrying the bevel gear 36 which is adapted to mesh with a similar bevel gear 37 upon a shaft 38 of a conveyer 39. The conveyer 39 is likewise provided with trough-forming members 40 which are similar to the trough-forming members 32 and 19 of the conveyer 31 and 18 respectively. The conveyer 39 is adapted to receive the bottles in upright relation from the conveyer 31 by any suitable means not shown. The conveyer 39 is inclined upwardly and has its discharge end supported by suitable means 41 within a leer housing 42. The leer housing 42 is formed into three portions, the two end portions each including a leer conveyer 43, see Fig. 3, having similar trough-forming members 44 upon its exposed and bottle supporting surface. Intermediate the two leer conveyers 43, there is positioned a bottle-receiving platform 45, and adjacent said platform is a bottle engageable member 46. Thus, the bottles discharged from the upper and leer discharging end of the conveyer 39 engage said transverse member 46 and are vertically positioned by the same upon the platform 45. A transverse guard member 47 is positioned beneath the return portion of the leer 39 and prevents the bottles from passing therebeneath.

Interposed between the member 46 and the platform 45 is a swinging arm 48 carrying upon the projecting end which terminates adjacent the guard 47 a sweep sheet 49 herein shown of U or V shaped outline, thereby forming a double engaging surface for bottles positioned upon the platform. The full lines in Fig. 1 indicate one position of the arm 48 and the sweep sheet 49; while the dotted lines indicate the opposite position, both of which are the extreme positions assumed by said swinging arm construction in alternately discharging a bottle from the platform to a leer division. It will be understood that there is provided walls 50 for substantially enclosing the leer conveyers 43, which have the bottle-receiving openings 51 adjacent the platform 45.

The conveyer 43 in each of the leer divisions is driven by suitable means 52 carried by the common shaft 53, and said shaft 53 includes a gear 54 intermediate said leer divisions which meshes with a gear 55 upon a shaft 56. The shaft 56 supports a cam 57 having a cam groove 58 which receives a cam follower 59 carried by one end of the lever arm 48, said arm being pivotally supported at 60 in a bracket or standard 61.

From the foregoing, therefore, it will be understood that the swinging arm 48 operates in timed relation with the movement of the conveyers in the leer divisions, thus interference, due to mistiming in the presentation of the bottles to the leers, is prevented.

As a further prevention of interference, the guard 47 is projected into and positioned above each conveyer 43 in the leer division and the same is enlarged, see Fig. 3, to form a guard plate 62, which guard plate 62 is provided with a plurality of rearwardly extending rods 63 which carry a collar 64. Concentric with the rod 63 and interposed between said collar 64 and the housing is a coiled spring 65. The outwardly projecting portion of the rod 63 is threaded and carries an adjusting nut 66. By this means the inner position of the bar 47 and plate 62 carrying the same is adjusted to the size of the bottle to be handled. Thus, with smaller bottles, the plate will have its initial position, as shown in the several figures; while for larger bottles, it may be retracted a suitable amount. Furthermore, the foregoing construction prevents jamming of the bottles, since in the event that a bottle is slightly deformed it may jam at the mouth 51 of the leer division when projected towards the same by the sweep sheet 49. In this event the bottle will pass on to the leer conveyer 43, because the plate 62 and guard 47 will yield in position and permit said bottle to register with one of the troughs.

From the foregoing, due to the timed arrangement, the troughs of the leers are loaded with a plurality of bottles which are maintained in upright position, the guard 62 simultaneously serving to prevent rearward toppling of the bottles the forward toppling being prevented by the first bottles positioned in the leer.

It will, of course, be understood that any number of conveyers may be interposed between the discharge conveyer 39 and the initial conveyer 18, as may be found necessary. Likewise, said conveyers may be provided with unit power or may be provided with power from a common source, and transmitted through the connections herein shown. While the power connection between the sprockets 41 and the sprockets associated with the other end of the conveyer 43 is not herein illustrated as connected together for power purposes, the same may be without departing from the invention, and thus the entire automatic bottle conveyer and feeder construction for leers will operate in timed relation with the leers and by suitably adjusting the speed of the bottle molding machine, all of said parts may operate automatically and in timed relation with each other.

The invention claimed is:

1. In an automatic bottle conveyer for leers, the combination of a chute open at its upper end, a platform pivotally supported adjacent and normally closing the open end of the chute, and a bladed transfer mechanism pivotally supported in said chute and closing the bottom thereof and adapted to receive bottles discharged into said chute from said platform.

2. A device of the character described in claim 1, characterized by a counterweight construction associated with the movable platform for balancing the same, whereby the bottle discharged upon said platform is the means for tilting said platform to discharge the bottle and the counterweight is the means for returning said platform to bottle receiving position.

3. A device of the character described in claim 1, characterized by a counterweight construction adjustably associated with the movable platform for balancing the same, whereby the bottle discharged on said platform is the means for tilting said platform to discharge the bottle and the counterweight is the means for returning said platform to bottle receiving position.

4. In an automatic bottle conveyer for leers, the combination of a chute having an open face and an open upper end, a platform pivotally supported adjacent and normally closing the open face and upper end of said chute, and a compartmented transfer mechanism pivotally supported in said chute beneath said platform adapted to receive bottles discharged therefrom, a guard for the open face of the chute and movable by the bottle carried by the transfer mechanism for retaining the bottle in a compartment until a predetermined time and thereupon permitting its discharge therefrom in a predetermined position, and a conveyer therebeneath to receive the bottles discharged by the transfer mechanism in said predetermined position.

5. A device of the character described in claim 4, characterized by the rigid connection of the platform and the guard whereby the same operate as a unit.

6. A device of the character described, including a divided leer, an arm pivotally supported between the leer divisions, a platform beneath said arm, means for erecting bottles on the platform, a conveyer discharging bottles to the platform for engagement by the erecting means and subsequent engagement by the swinging arm for alternate discharge to the leer divisions, a guard positioned beneath the conveyer and adjacent the platform for preventing jamming of the bottles between the platform and the conveyer, and a common driving connection operating said swinging arm in timed relation with the timed relation movement of said leer conveyers.

7. A device of the character described, including a divided leer, an arm pivotally supported between the leer divisions, a platform beneath said arm, means for erecting bottles on the platform, a conveyer discharging bottles to the platform for engagement by the erecting means and subsequent engagement by the swinging arm for alternate discharge to the leer divisions, a guard positioned beneath the conveyer and adjacent the platform for preventing jamming of the bottles between the platform and the conveyer, and a yielding mounting for said guard.

8. A device of the character described, including a divided leer, an arm pivotally supported between the leer divisions, a conveyer positioned between said leer divisions in line with said arm pivot and discharging bottles to the arm for subsequent alternate discharge to the leers, a guard associated with each leer division for preventing rearward toppling of the bottles when discharged to the leer division by said swinging arm, and a yielding mounting for said guard.

In witness whereof I have hereunto affixed my signature.

WILLIAM W. GLASS.